United States Patent [19]

Takahashi

[11] 4,395,763

[45] Jul. 26, 1983

[54] BUFFER MEMORY CONTROL SYSTEM OF THE SWAP SYSTEM

[75] Inventor: Masanori Takahashi, Tokyo, Japan

[73] Assignee: Fujitsu Limited, Kanagawa, Japan

[21] Appl. No.: 213,401

[22] Filed: Dec. 5, 1980

[30] Foreign Application Priority Data

Dec. 6, 1979 [JP] Japan .............................. 54-158417

[51] Int. Cl.³ .......................................... G06F 13/00
[52] U.S. Cl. ................................................ 364/900
[58] Field of Search ... 364/200 MS File, 900 MS File

[56] References Cited

U.S. PATENT DOCUMENTS

| 3,588,829 | 6/1971 | Boland et al. | 364/200 |
| 3,967,247 | 6/1976 | Anderson et al. | 364/200 |
| 4,161,024 | 7/1979 | Joyce et al. | 364/200 |
| 4,173,781 | 11/1979 | Cencier | 364/200 |

Primary Examiner—Harvey E. Springborn
Attorney, Agent, or Firm—Staas & Halsey

[57] ABSTRACT

In a buffer memory for a swap data block storage system, in the writing of data in an area of a size equal to or an integral multiple of a block of the buffer memory, when it is detected that a block including an address at which data to be written does not exist in the buffer memory, data is written in a replace block of the buffer memory directly without conducting at least an operation of moving out a block from a main memory.

3 Claims, 6 Drawing Figures

BUFFER MEMORY CONTROL SYSTEM OF THE SWAP SYSTEM

BACKGROUND OF THE INVENTION

1. Field of the Invention

The present invention relates to a buffer memory control system for a swap system which processes an ordinary memory access only to a buffer memory and, when no data of a requested address exists in the buffer memory, moves out therefrom any one of blocks to a main memory and moves from the main memory into the buffer memory a block including data of the requested address. More particularly, the invention pertains to such a buffer memory control system for the swap system which is adapted so that when no data of the requested address exists in the buffer memory, the data is written directly in the buffer memory from the main memory under a specified condition.

2. Description of the Prior Art

In a conventional processor having a buffer memory and a main memory, when new data is to be written into the buffer memory, a tag is retrieved to decide whether needed data having a requested address is stored in the buffer memory and in the case of the needed data of the requested address existing in the buffer memory, a block including the needed data having the requested address is read out from the buffer memory and merged with the new write data and then written again in the buffer memory. In the case where the needed data of the requested address does not exist in the buffer memory, a replace block of the buffer memory which is located by a replace circuit is moved out to the main memory and then a block including the needed data of the requested address is read out from the main memory and merged with the new write data, thereafter being written in the buffer memory. That is, wherever the needed data of the requested address does not exist in the buffer memory, the block including the needed data of the requested address is moved into the buffer memory from the main memory.

Incidentally, in the processing of a write instruction (a block store instruction) for an area of a size equal to or an integral multiple of the block which is a basic storage unit of the buffer memory, since the entire block is rewritten, a part of the contents of the block is not of interest but is moved into the buffer memory from the main memory at that same time. Accordingly, in the processing of the write instruction the time for reading out the main memory generally corresponds to same loss of operation time. The swap system is disclosed, for example, in U.S. Pat. Nos. 3,771,137 and 3,848,234.

SUMMARY OF THE INVENTION

It is an object of the present invention to increase the processing speed of a write instruction to an area of a size equal to or an integral multiple of a block corresponds to a basic storage unit of the buffer memory.

Briefy stated, according to the present invention, in the buffer memory control system for a swap system which processes an ordinary memory access only to a buffer memory and only when no data of a requested address exists in the buffer memory, moves out therefrom a selected one of blocks to a main memory and moves from said main memory into the buffer memory a block including the data of the requested address, there are provided means for detecting whether a block including the needed data of the requested address exists in the buffer memory and means for detecting whether the replace block which was previously sent from the main memory has been modified after being loaded in the buffer memory. In the processing of a write instruction to the area of a size equal to or an integral multiple of the basic block of the buffer memory, when it is detected that data corresponding to a write address does not exist in the buffer memory, data is written directly in the replace block of the buffer memory without moving therein the abovesaid block from the main memory.

DESCRIPTION OF THE PREFERRED EMBODIMENTS

Figure 1:
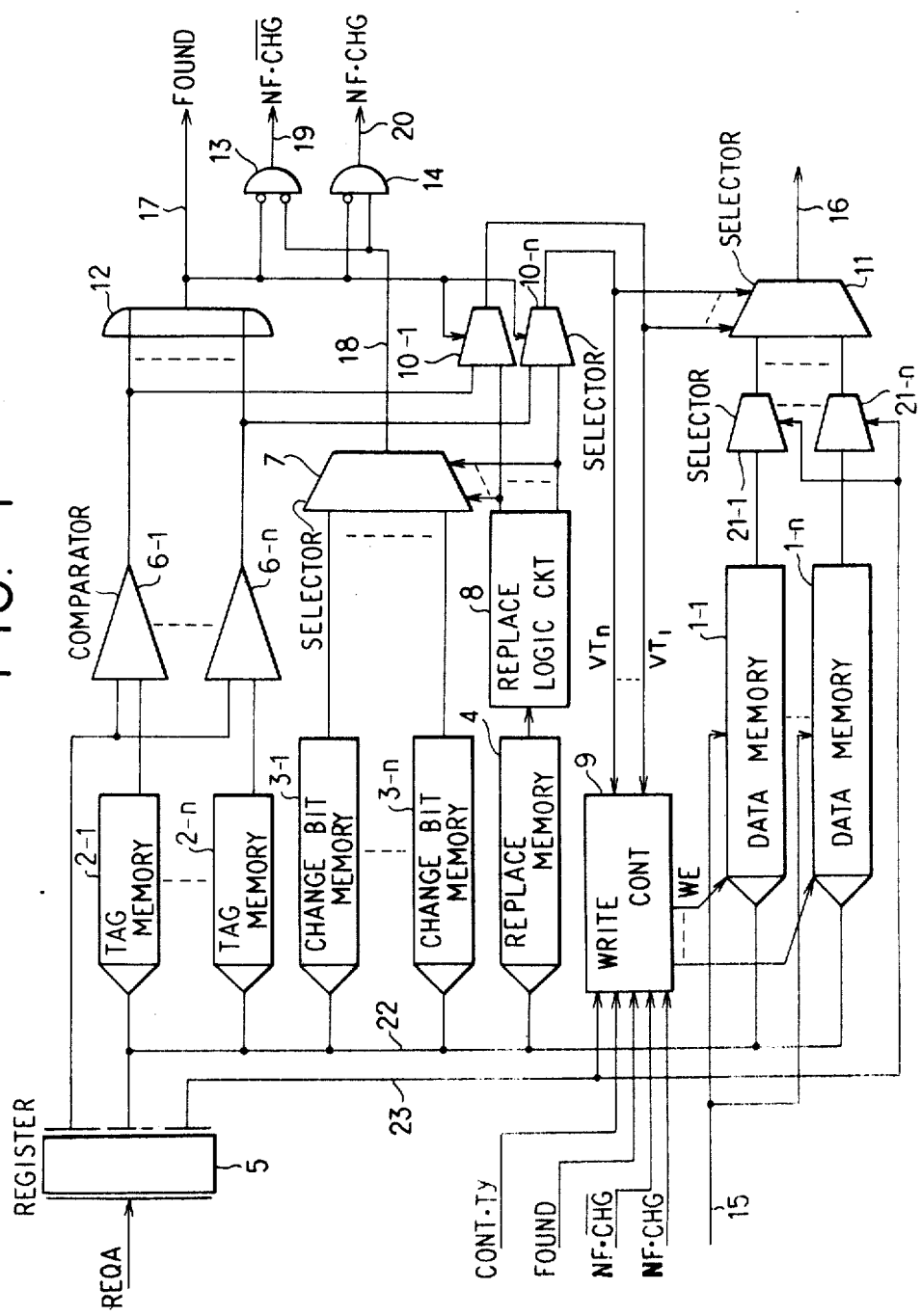
FIG. 1 is a block diagram illustrating a buffer memory circuit of an embodiment of the present invention.

FIG. 1 illustrates in block form an embodiment of the present invention. Reference numerals 1-1 to 1-$n$ indicate data memories for storing data, each of which memories comprise a control unit such that, for example, 64 bytes form one block; 2-1 to 2-$n$ designate tag memories; 3-1 to 3-$n$ identify change bit memories for storing the presence or absence of a change in the contents of the data memories in correspondence with their blocks; 4 denotes a replace memory for storing information for replace blocks of the data memories; 5 represents a register for setting a requested address REQA; 6-1 to 6-$n$ show comparators for comparing low-order bits set in the register 5 with the contents of the tag memories; 7, 10-1 to 10-$n$, 11 and 21-1 to 21-$n$ refer to selectors; 8 indicates a replace logic circuit; 9 designates a write control circuit for controlling the writing of data into the data memories; 12 identifies an OR circuit; 13 and 14 denote gate circuits; 15 represents a write data line; 16 shows a read data line; 17 refers to a coincidence detection signal line on which a coincidence signal FOUND is provided; 18 indicates a change detection signal line; 19 designates a signal line on which a noncoincidence-noncharge signal NF·CHG is provided; 20 identifies a signal line on which a noncoincidence-change signal NF·CHG is provided; 22 denotes a set address line; and 23 represents an intra-block address line.

Figure 2:
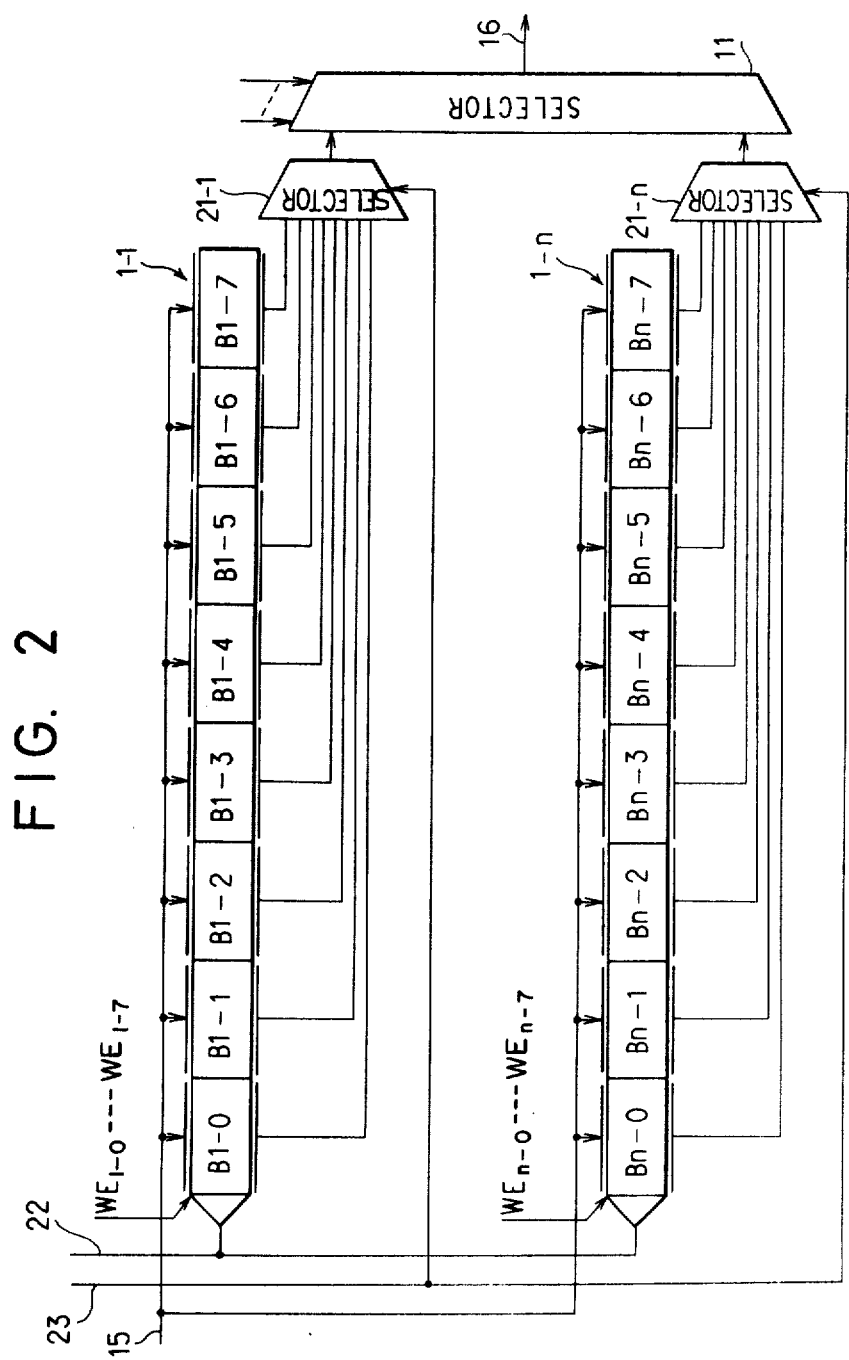
FIG. 2 is a block diagram showing a data memory part.

FIG. 2 is a block diagram showing the data memory part. Each block of the data memories 1-1 to 1-$i$ n has a capacity of 64 bytes and comprises access units B1-0 to B1-7 ... Bn-0 to Bn-7, each including eight bytes. Data read out in accordance with a set address from the address line 22 are selected by the selectors 21-1 to 21-$n$ in accordance with an intra-block address from the address line 23, thereafter being applied to the selector 11. The selector 11 performs a select operation in accordance with signals from the selectors 10-1 to 10-$n$ and provides the selected data on the read data line 16.

Figure 3:
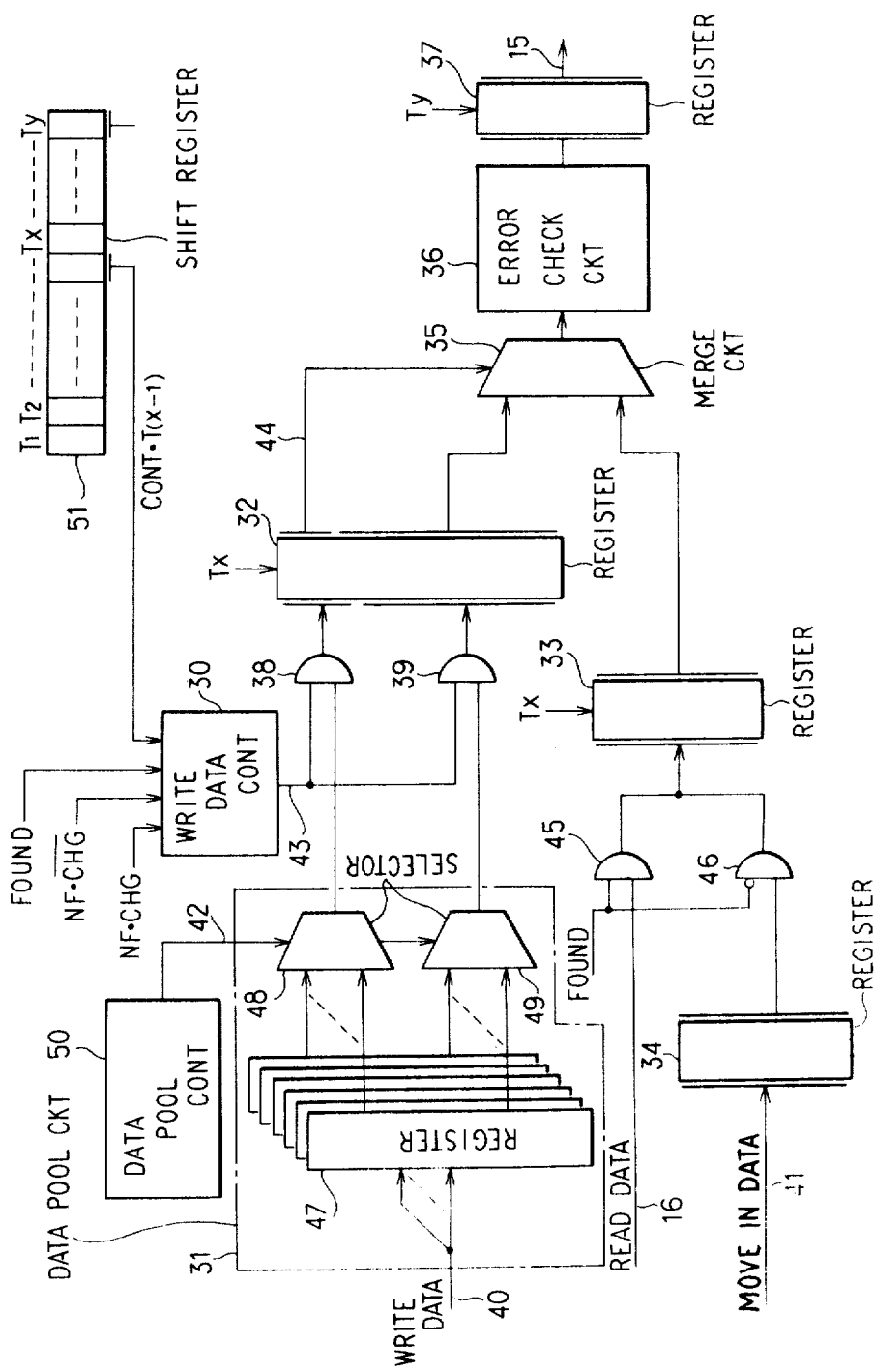
FIG. 3 is a block diagram illustrating a buffer memory write control circuit in the embodiment of the present invention.

FIG. 3 illustrates, in block form, a buffer memory write control circuit. Reference numeral 30 indicates a write data control circuit, which is supplied with the coincidence detection signal FOUND, the noncoincidence-nonchange signal NF·CHG, the noncoincidence-change signal NF·CHG and a control signal CONT·T(x−1) having a timing T(x−1) from a control shift register 51 to provide a read enable signal on a signal line 43. Reference numeral 31 designates a data pool circuit, which comprises registers 47 for setting write data from a write data line 40 and selectors 48 and 49; 32 identifies a write data register, in which data are set at a timing Tx; 33 denotes a read data register, in which data are set at the timing Tx; 34 represents a register for setting move in data from a move in data line 41; 35 shows a merge circuit, which merges data from the registers 32 and 33 in response to a byte mark signal from a byte mark signal line 44; 36 refers to an error check circuit; 37 indicates a register for setting data at a timing y; 38, 39, 45 and 46 designate gate circuits; 50 identifies a data pool control circuit, which applies a read address via a read address line 42 to selectors 48 and 49; and 51 denotes a shift register for sequentially shifting a control signal at timings T1 to Tx to Ty.

Figure 4:
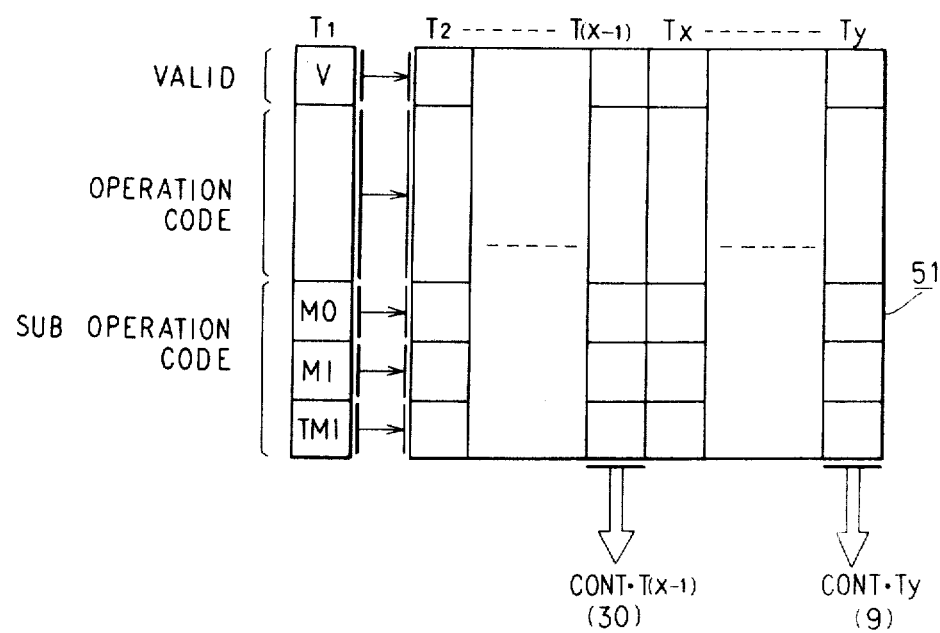
FIG. 4 is explanatory of a control shift register.

FIG. 4 is explanatory of the shift register 51 for control use. A valid signal V, operation codes and sub operation codes are set in the first stage of the shift register 51 at the timing T1 and shifted to the following stages at the timings T2 to Tx to Ty. At the timing T(x−1) the control signal CONT·T(x−1) including the valid signal V, the operation codes OPC and the sub operation codes is applied to the write data control circuit 30. At the timing Ty a control signal CONT·Ty is applied to the write control circuit 9. The sub operation code MO becomes ON in the case of the move out operation, the sub operation code MI becomes ON in the case of the move in operation and the sub operation code TMI becomes ON in the case of the tag move in operation.

Figure 5:
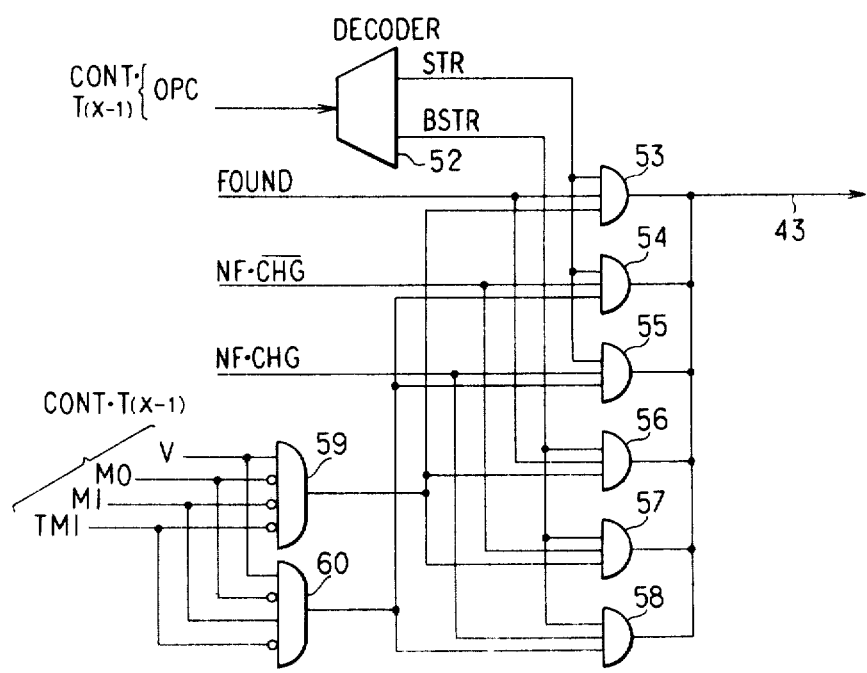
FIG. 5 is a block diagram showing the principal part of a write data control circuit used in FIG. 3.

FIG. 5 shows in block form the write data control circuit of FIG. 3 30 in the buffer memory write control circuit. Reference numeral 52 indicates a decoder for decoding an operation code OPC; and 53 to 60 designate gate circuits. To the gate circuits 59 and 60 are applied the valid signal V, the move out signal MO, the move in signal MI and the tag move in signal TMI of the control signal CONT·T(x−1) and when only the valid signal V is "1", the output from the gate circuit 59 becomes "1". When only the valid signal V and the move in signal MI are "1", the gate circuit 60 outputs "1". The outputs STR and BSTR from the decoder 52 are a store signal and a block store signal respectively and a read enable signal is provided on the signal line 43.

Figure 6:
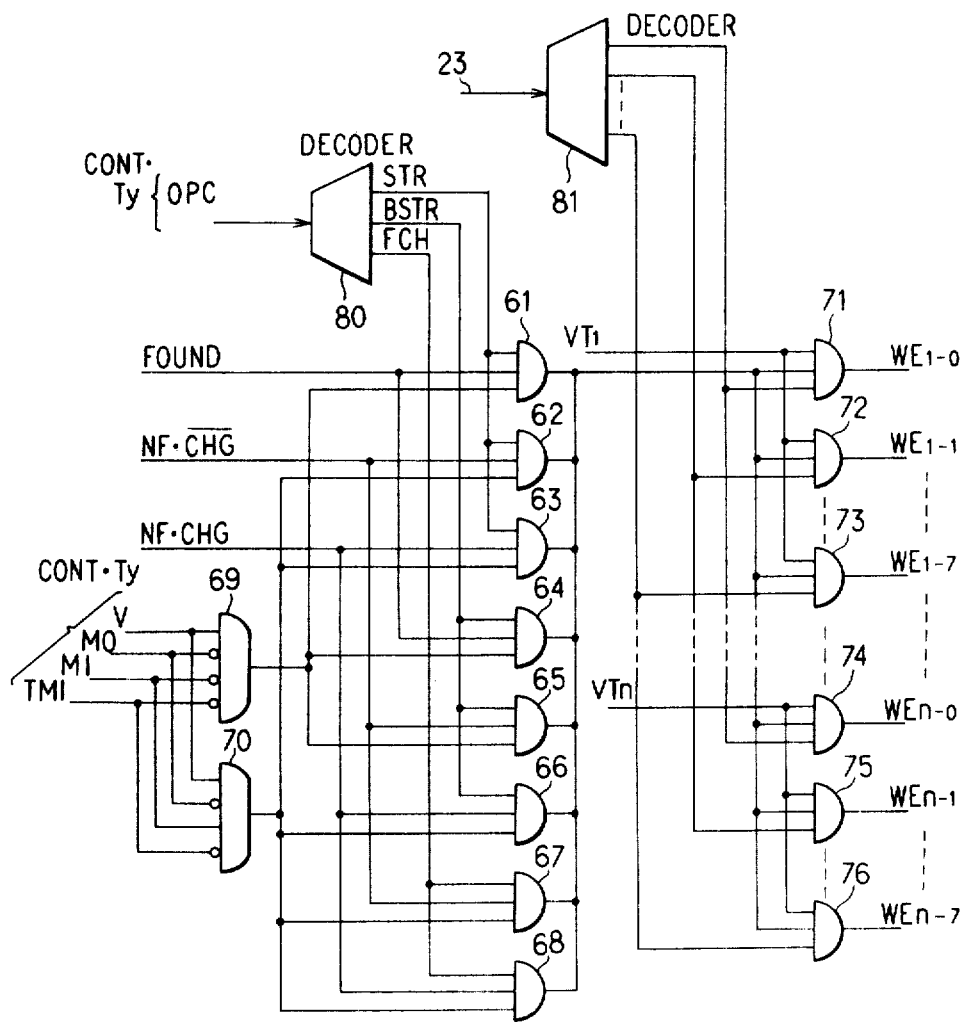
FIG. 6 is a block diagram illustrating the principal part of a write control circuit utilized in FIG. 1.

FIG. 6 illustrates in block form the principal part of the write control circuit 9 of FIG. 1. Reference numerals 61 to 76 indicate gate circuits; and 80 and 81 designate decoders. To the gate circuits 69 and 70 are provided the valid signal V, the move out signal MO, the move in signal MI and the tag move in signal TMI of the control signal CONT·Ty. The decoder 80 decodes the operation code OPC of the control signal CONT·Ty to output a store signal STR, a block store signal BSTR or a fetch signal FCH. The decoder 81 decodes the intra-block address from the address line 23 to designate selected ones of the access units B1-0 to Bn-0 . . . B1-7 to Bn-7 in the block of the data memory. For example, if a three-bit intra-block address is "010", then access units B1-2 to Bn-2 in the block are designated. The outputs from the gate circuits 71 and 76 become write enable signals WE1-0 to WE1-7 . . . WEn-0 to WEn-7 respectively corresponding to the access in the blocks of the data memory. Reference characters VT1 to VTn indicate output signals from the selectors 10-1 to 10-n in FIG. 1.

Next, a description will be given of the operation of the present invention.

In the control shift register 51 are set the valid signal, the operation codes and the sub operation codes of operation information which are to be executed in connection with a memory access request. In ordinary read processing, the operation code indicates a fetch and the valid signal V becomes "1". The requested address REQA is set in the register 5. A first flow is to (a) read out the tag memories 2-1 to 2-n for detecting whether data of the requested address exists in the buffer memory, that is, the data memories 1-1 to 1-n, (b) read out the replace memory 4 for determining a replace block for updating the content of the replace memory 4, (c) read out the change bit memories 3-1 to 3-n, however, in case the data of the requested address do not exist in the buffer memory then (d) read data is set in the register 37 from the buffer memory. Next, according to conditions in the first flow, the sub operation code is set in the control shift register 51 and the operation proceeds to a move out flow, a move in flow and a tag move in flow.

In the ordinary read processing, the contents read out from the tag memories 2-1 to 2-n and the requested address set in the register 5 are compared by the comparators 6-1 to 6-i n and when the data of the requested address exists in one of the data memories 1-1 to 1-n, any the respective one of the comparators 6-1 to 6-n outputs "1", by which the coincidence detection signal FOUND on the signal line 17 becomes "1". Further, any one of the selectors 10-1 to 10-n outputs "1", which is provided to the selector 11 and the write control circuit 9. In accordance with the set address of the requested address REQA, data are read out from the data memories 1-1 to 1-n and in accordance with the intra-block address the selectors 21-1 to 21-n each provide read data of one part of the designated block to the selector 11. By outputting "1" from any one of the selectors 10-1 to 10-n, the selector 11 selects a block for output of the read data from the access unit selected by the selectors 21-1 to 21-n to provide the read data of the access unit of the selected block on the read data line 16.

Where the data of the requested address do not exist in the data memories 1-1 1-n, the coincidence detection signal FOUND becomes "0". By reading out the replace memory 4 a replace block is located by the replace logic circuit 8. Further, the change bit memories 3-1 to 3-n are read out and if no bit change is detected, then the noncoincidence-nonchange signal NF·CHG on the signal line 19 becomes "1", and if a bit change is detected, the noncoincidence-change signal NF·CHG on the signal line 20 becomes "1".

In the case where NF·CHG="1", the operation proceeds to the move in flow. That is, the operation code indicates a fetch and the move in signal MI of the sub operation code becomes "1". In the move in flow, since 64-byte data are written in each block, the move in of one block to the data memory is accomplished by applying the move in flow for eight-byte unit processing to the shift register 51 eight times in succession. In the move in flow, data read out from the main memory are set in the register 34 from the move in data line 41 and then set in the register 33 via the gate circuit 46 at the timing Tx. When the byte mark signals from the signal line 44 are all "0", the merge circuit 35 outputs the content of the register 33 and sets it in the register 37 via the error check circuit 36 at the timing Ty. The data thus set in the register 37 are provided on the write data line 15 and written in the replace block of the data memories 1-1 to 1-i n and at the same time, delivered as read data to the access requesting terminal.

In the case of NF·CHG="1", the operation proceeds to the move out flow. In the move out flow, since 64-byte data are provided to the main memory, the move out of one block to the main memory is accomplished by applying the move out flow for eight-byte unit processing to the shift register 51 eight times in succession. In this move out flow, the replace block of the data memory 1-1 to 1-n is moved out and then the operation proceeds to the move in flow. The operation of the move in flow is the same as described previously.

The move in flow is followed by the tag move in flow, in which an address is registered in the tag memory, the content of the replace memory 4 is updated and "0" is written into the change bit memory.

The processing for writing the data of one part of the block is carried out in the same manner as in the aforesaid read processing. That is, the tag memories 2-1 to 2-n are read out and it is detected by the comparison results having of the comparators 6-1 to 6-n whether the data of the requested address exist in the blocks or not. In the case where the coincidence detection signal FOUND is "1", "1" is written in the change bit memories 3-1 to 3-i n, and a block including the data of the requested address is read out from the respective data memory. Then the read data on the read data line 16 and the write data on the write data line 40 connected to the processing unit are applied to the merge circuit 35 and data merged in accordance with the byte mark signal on the signal line 44 which is checked by the error check circuit 36; in this case, if no error is detected, the data is set in the register 37 and then provided on the write data line 15. From the write data line 15 the data is applied to the data memories 1-1 to 1-n, wherein the data is written in the part of the block which is determined by the intra-block address and the write enable signal WE (WE1-0 to WE1-7 . . . WEn-0 to WEn-7) from the write control circuit 9.

In the case where the data having the requested address does not exist in the buffer memory, the replace block is determined by the contents read out from the replace memory 4 and, when no bit change is detected by the contents read out from the change bit memories 3-1 to 3-n, the move in data and the write data are merged together and the merged data is provided as write data to the data memory, wherein the data is written in a designated block as is the case with the foregoing example. Then the requested address is registered in the tag memory and "1" is written in the change bit memory. When a bit change is detected, the replace block is moved out and, thereafter, a data write is conducted by the same operations as described above.

The above operations are substantially the same as employed in the swap system. The present invention has its feature in the block store processing. A description will be given first in connection with the case where the data of the requested address REQA exists in the buffer memory. In this case, the coincidence detection signal FOUND becomes "1" and the operation code OPC of the control signal CONT·T(x−1) which is outputted from the shift register 51 at the timing T(x−1) is decoded by the decoder 52, by which the block store signal becomes "1". Further, since only the valid signal V becomes "1", the gate circuit 56 outputs "1" and the read enable signal on the signal line 43 becomes "1".

The write data are set from the write data line 40 in the registers 47 of the data pool circuit 31 and since the read enable signal is "1", the data are set in the register 32 via the selectors 48 and 49 and the gate circuits 38 and 39 at the timing Tx. In this case, the byte mark signals are all "1".

Since the byte mark signals from the signal line 44 are all "1", the merge circuit 35 provides the write data of the register 32 to the error check circuit 36 regardless of read data of the register 33 and the data applied to the error check circuit 36 are set in the register 37 at the timing Ty.

At the timing Ty the operation code OPC of the control signal CONT·Ty is decoded by the decoder 80 and the block store signal BSTR becomes "1". Moreover, since the valid signal V is "1", the gate circuit 64 provides an output "1".

In the block store, data are all written in one block of the data memory by applying to the shift register 51 eight times in succession (8 bytes × 8 = 64 bytes) a first flow for eight-byte unit processing in which the block store signal BSTR is 37 1"0 and the valid signal V is "1". For example, assuming that in the first flow the intra-block address on the address line 23 is decoded by the decoder 81 and the write enable signal WE1-0 becomes "1" by the output signals VT1 to VTn from the selectors 10-1 to 10-n, the write data provided from the register 37 to the data memories 1-1 to 1-n via the write data line 15 are written in the block B1-0 of the data memory 1-1. Thereafter, when the second to eighth first flows of the block store are sequentially applied to the shift register 51, the intra-block address on the address line 23 is set to such a value that 1 is added to the value in the previous first flow, by which the write enable lines WE1-1 to WE1-7 sequentially become "1" and the data are written in the blocks B1-1 to B1-7 of the data memory 1-1 in a sequential order. Further, "1" is written in the position of the corresponding block of the change bit memory.

In the case where the data having the requested address does not exist in the buffer memory and the contents of the replace block does not change after the replace block is loaded in the buffer memory from the main memory, the coincidence detection signal FOUND is "0" and the noncoincidence-nonchange signal NF·CHG on the signal line 19 is "1", both of which signals are generated in parallel. In this case, data are written in the data memories 1-1 to 1-n in the same manner as in the case where the coincidence detection signal FOUND is "1". That is, the move out of the replace block and the move in of the block including the data of the requested address from the main memory do not take place. At the timing Tx, the write data are set in the register 32 and since the byte mark signals are all "1", the data in the register 32 are set in the register 37 at the timing Ty regardless of the data in the register 33 and the data set in the register 32 are provided on the write data line 15, from which they are written in the data memory by the write enable signals which are outputted in accordance with the control signal CONT·Ty of the timing Ty and the intra-block address.

In the case where the content of the replace block changes after the replace block is loaded in the buffer memory from the main memory, the noncoincidence-change signal NF·CHG on the signal line 20 becomes "1". In this case, the operation proceeds to the move out flow. That is, the operation code indicates the block store and the move out signal MO of the sub operation code becomes "1". As a consequence, the move out of the replace block takes place. Next, the operation proceeds to the move in flow. Namely, the operation code indicates the block store and the move in signal MI of the sub operation code becomes "1". In this move in flow, since the control signal CONT·T(x−1) becomes such that V="1", MI="1", MO="0" and TMI="0", the gate circuit 60 produces an output "1" and the block store signal BSTR which is derived from the decoder 52 becomes "1". Since NF·CHG="1", the gate circuit 58 yields an output "1" and the read enable signal on the signal line 43 becomes "1".

The write data pooled in the data pool circuit 31 are set in the register 32 via the gate circuits 38 and 39 at the timing Tx and since the byte mark signals on the signal line 44 are all "1", the merge circuit 35 sets only the content of the register 32 in the register 37 via the error check circuit 36 at the timing Ty without regard to the data in the register 33 in which move in data of the register 34 have been set.

At the timing Ty the control signal CONT·Ty is applied to the write control circuit 9 and the gate circuits 70 and 66 yield outputs "1" and the data are written in the data memory by the write enable signal which is determined by the output from the decoder 81 and the outputs from the selectors 10-1 to 10-n.

Next, the operation shifts to the tag move in flow.

In the block store instruction, in the case where NF·CHG="1", that is, in the case where the data of the requested address do not exist in the data memories 1-1 to 1-n and the content of the replace block is not changed after the block is loaded in the data memories 1-1 to 1-n, as described previously, data are written in the replace block directly without conducting the move out flow and the move in flow. Accordingly, when the block store instruction continues, a non-useful operation time in the write processing is removed, permitting high-speed processing. Especially in the case of handling large data, it happens that data are written by the block store instruction in an area of a size which is equal to or an integral multiple of the block of the buffer memory; accordingly, the elimination of the move out and the move in operation makes it possible to greatly increase the throughput of the buffer memory.

It will be apparent that many modifications and variations may be effected without departing from the scope of the novel concepts of this invention.

What is claimed is:

1. A control system for writing data in a buffer memory of a swap type data block storage system which control system performs an ordinary memory access only with the buffer memory and when data having a requested address does not exist in a data block of the buffer memory, moves out from the buffer memory a selected one of replaceable data blocks thereof to a main memory and moves from said main memory into the buffer memory a data block from the main memory which includes the data at the requested address, said control system comprising:

a first detecting means for detecting whether the data block of the buffer memory including the data of the requested address exists in the buffer memory; and a second detecting means for detecting whether the replaceable data block has been changed after being previously loaded in the buffer memory;

including means for writing data in the buffer memory in an area of a size equal to or an integral multiple of the data block of said buffer memory when it is detected by said first detecting means that the data corresponding to said requested address does not exist in the buffer memory and it is detected by said second detecting means that the replaceable data block has not been changed, wherein data including the data to be written in is written in the replaceable data block of the buffer memory directly without performing at least the operation of moving in the requested address block from the main memory including data at the requested address so that the data in the replaceable block is overwritten with the data for the requested address.

2. A buffer memory and control system for said buffer memory operatively connected to a processing unit, which processing unit generates a request signal and data to be written, and to a main memory storing move-in data, comprising:

a data memory, operatively connected to the processing unit and to the main memory, for storing data used by and generated by the processing unit and for selectively outputting the data in dependence upon the request signal; p1 a tag memory, operatively connected to the processing unit, for storing tag signals indicating whether data needed by the processing unit is stored in said data memory;

a change memory, operatively connected to the processing unit, for storing change signals indicating whether data stored in said data memory has been changed by the processing unit;

a replace memory, operatively connected to the processing unit, for storing replace signals that indicate whether data stored in said data memory can be replaced;

write control means, operatively connected to said processor, to said tag memory, to said change memory, to said replace memory and to said data memory, for controlling where data is stored in said data memory in dependence upon the request signals, the tag signals, the change signals and the replace signals; and a write control circuit, operatively connected to the processing unit, to the main memory and, to said tag memory, to said change memory, to said replace memory, to said data memory and to said write control means, for controlling the storing of the move-in data from said main memory in said data memory in dependence upon the tag signals, the change signals and the replace signals, wherein when said tag signals indicate that data requested by the processing unit is not in said data memory, when said replace signals indicate that data stored in said data memory can be replaced, when said change signals indicate that data stored in said data memory has not been changed and when the data to be written in the data memory by the processing unit is equal to or is an integral multiple of the size of a block, the data to be written replaces the data that can be replaced without moving in the move-in data, wherein said tag signals, said replace signals and said change signals are produced in parallel by the respective said tag memory, said replace memory and said change memory.

3. A buffer memory and control system as recited in claim 2, wherein said processing unit generates write data as the data to be written, and wherein said write control circuit comprises:
- a data pool circuit, operatively connected to the processing unit, for storing the write data received from the processing unit;
- a control register, operatively connected to said data memory, for storing control signals for timing outputting and storing of data from and into said data memory;
- a write data control circuit, operatively connected to said control register, to said tag memory and to said change memory, for generating an enable signal for controlling the storing of data into said data memory in dependence upon the respective control, tag and change signals; and
- a merging circuit, operatively connected to said data memory and to said data pool circuit and to said main memory, for merging and storing in said data memory the write data, move-in data and data stored in said data memory, so that the data stored in said data memory can be updated by the write data, replaced by the move-in data or returned to said data memory unchanged.

* * * * *

UNITED STATES PATENT AND TRADEMARK OFFICE
CERTIFICATE OF CORRECTION

PATENT NO. : 4,395,763                                    Page 1 of 2

DATED      : JULY 26, 1983

INVENTOR(S) : MASANORI TAKAHASHI

It is certified that error appears in the above-identified patent and that said Letters Patent is hereby corrected as shown below:

On the title page;

[57] ABSTRACT
           line 6, "is" should be --are--;
           line 8, after "from" insert --the buffer
               memory and into--.

Col. 1, line 50, after "to" insert --the--.

Col. 2, line 59, "1-i n" should be --1-n--.

Col. 3, line 20, "y" should be --Ty--;
      line 41, delete "of FIG. 3";
      line 42, after "circuit" insert --of FIG. 3--.

Col. 4, line 1, "and" should be --to--;
      line 3, after "access" insert --units--;
      line 32, "6-i n" should be --6-n--;
      line 33, delete "any";
      line 50, "1-1 1-n" should be --1-1 to 1-n--.

UNITED STATES PATENT AND TRADEMARK OFFICE
CERTIFICATE OF CORRECTION

PATENT NO. : 4,395,763

DATED : JULY 26, 1983

INVENTOR(S) : MASANORI TAKAHASHI

It is certified that error appears in the above-identified patent and that said Letters Patent is hereby corrected as shown below:

Col. 5, line 8, "1-i n" should be --1-n--;
line 28, delete "having";
line 29, "of" should be --having--;
line 32, "3-i n" should be --3-n--.

Col. 6, line 27, "37 1" O" should be --"1"--;
line 38, "1" should be --"1"--;
line 52, "in parallel" should be --at substantially the same time--.

Col. 8, line 29, delete "pl"; [begin a new paragraph with "a tag"];
line 49, delete "and".

Signed and Sealed this

Second Day of July 1985

[SEAL]

Attest:

DONALD J. QUIGG

Attesting Officer    Acting Commissioner of Patents and Trademarks